US012053795B2

(12) United States Patent
Hostnik

(10) Patent No.: US 12,053,795 B2
(45) Date of Patent: Aug. 6, 2024

(54) PASTE-LIKE MEDIUM APPLICATOR

(71) Applicant: Blaž Hostnik, Škofja Loka (SI)

(72) Inventor: Blaž Hostnik, Škofja Loka (SI)

( * ) Notice: Subject to any disclaimer, the term of this patent is extended or adjusted under 35 U.S.C. 154(b) by 0 days.

(21) Appl. No.: 17/768,694

(22) PCT Filed: Oct. 13, 2020

(86) PCT No.: PCT/IB2020/059586
§ 371 (c)(1),
(2) Date: Apr. 13, 2022

(87) PCT Pub. No.: WO2021/074777
PCT Pub. Date: Apr. 22, 2021

(65) Prior Publication Data
US 2024/0123465 A1 Apr. 18, 2024

(30) Foreign Application Priority Data
Oct. 16, 2019 (SI) .................................... 201900197

(51) Int. Cl.
*B05C 17/005* (2006.01)

(52) U.S. Cl.
CPC .............................. *B05C 17/00516* (2013.01)

(58) Field of Classification Search
CPC ............ B05C 17/005; B05C 17/00503; B05C 17/00506; B05C 17/00516; B05C 17/0052; E04F 21/02; E04F 21/023; E04F 21/08

(Continued)

(56) References Cited

U.S. PATENT DOCUMENTS 5,277,511 A * 1/1994 Stockton ................. E04F 21/08 401/265
6,213,633 B1 * 4/2001 Kramer ............. B01F 25/44163 222/137

(Continued)

FOREIGN PATENT DOCUMENTS

DE 10 2014 113 101 A1 3/2016
WO 2014/022880 A1 2/2014

OTHER PUBLICATIONS

International Search Report issued in PCT/IB2020/059586; mailed Feb. 12, 2021.

*Primary Examiner* — David P Angwin
*Assistant Examiner* — Bradley S Oliver
(74) *Attorney, Agent, or Firm* — Studebaker & Brackett PC

(57) ABSTRACT

A paste-like medium applicator comprising an inlet opening of the paste-like medium applicator, a plurality of outlet openings for applying a paste-like medium onto a surface to be treated, and a distribution channel for distributing the paste-like medium from the applicator's inlet opening to the outlet openings, wherein the paste-like medium applicator is formed of a first elongated half-shell with the inlet opening of the applicator and a second elongated half-shell with a plurality of outlet openings, wherein the side walls of the two half-shells have at each open end an integrally shaped circular edge surface, which, in the working position of the applicator, define a distribution channel, wherein the first and second half-shells are integrally connected by a film hinge and the first and second half-shells being respectively provided with latching elements with a barb and the second and first half-shells being respectively provided with receiving elements for receiving the latching elements so that in the (Continued)

Figure 1:
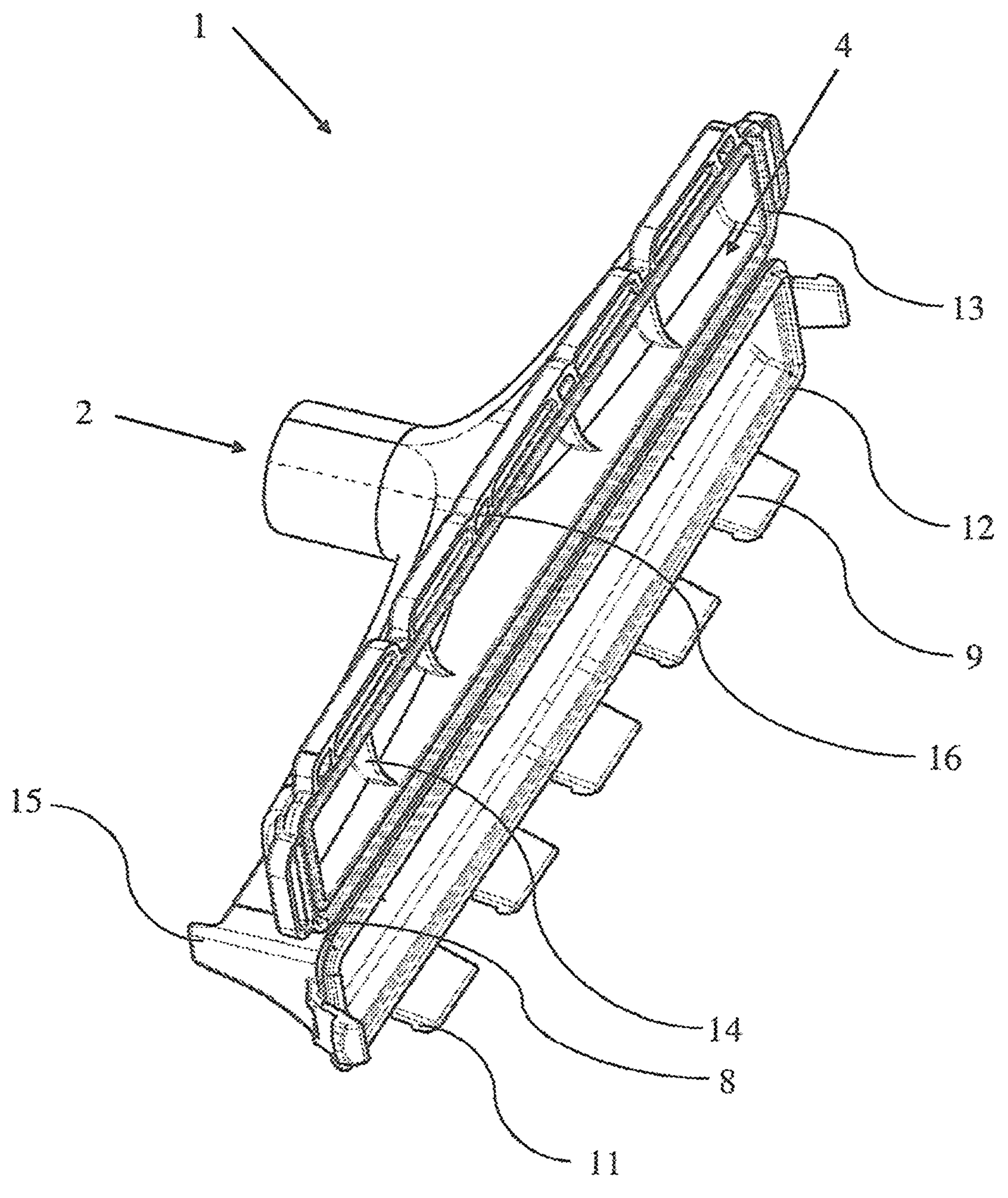

working position of the applicator each latching element with the barb is latched in the corresponding receiving element. The advantage of the applicator is its monolithic configuration, which reduces the manufacturing costs and shortens the production time.

13 Claims, 5 Drawing Sheets

(58) Field of Classification Search
USPC .............................................................. 401/28
See application file for complete search history.

(56) References Cited

U.S. PATENT DOCUMENTS

| | | | | |
|---|---|---|---|---|
| 9,713,821 | B2 * | 7/2017 | Liao | B29C 48/07 |
| 2007/0127978 | A1 | 6/2007 | Park | |

* cited by examiner

PASTE-LIKE MEDIUM APPLICATOR

FIELD OF INVENTION

The invention relates to a paste-like medium applicator for applying media such as silicones, polyurethane foams, etc., used as adhesives, sealing or insulating materials, etc., to flat surfaces.

PRIOR ART

Many paste-like medium applicators are known from prior art, having an inlet opening for coupling with a paste-like medium container or a paste-like medium dispenser, and a plurality of outlet openings, through which the paste-like medium is applied onto a surface. Paste-like medium containers may be in the form of a cylindrical cartridge and provided with a plunger which, when activated, presses the paste-like medium out of a bag- or tube-shaped container. Applicators can be used in conjunction with gun-shaped tools for dispensing a paste-like medium. Using an applicator, a paste-like medium is evenly applied onto a surface. Due to their complex shape, applicators are made from plastics known from prior art and consist of at least two injection moulded pieces. When manufacturing an applicator, different pieces need to be assembled and bonded by gluing, welding or in another suitable way. This is time consuming and makes the production more expensive.

Technical Problem

The technical problem is how to provide a monolithic paste-like medium applicator.

Solution to the Technical Problem

The technical problem is solved by a paste-like medium applicator comprising an inlet opening of the paste-like medium applicator, a plurality of outlet openings for applying a paste-like medium onto a surface to be treated, and a distribution channel for distributing the paste-like medium from the applicator's inlet opening to the outlet openings, wherein the paste-like medium applicator is formed of a first elongated half-shell comprising four side walls and a bottom, in which the inlet opening of the applicator is disposed, and a second elongated half-shell comprising four side walls and a bottom, in which a plurality of outlet openings are arranged, wherein the side walls of the two half-shells have at each open end an integrally shaped circular edge surface, which, in the working position of the applicator, abut each other so that the half-shells define a distribution channel, wherein the first and second half-shells are in each case on one of their longitudinal sides integrally connected by means of a film hinge and the first and second half-shells being respectively provided with latching elements with a barb and the second and first half-shells being respectively provided with receiving elements for receiving the latching elements so that in the working position of the applicator each latching element with the barb is latched in the corresponding receiving element.

The advantage of the applicator according to the invention is its monolithic configuration. In the manufacturing process of the applicator various pieces need not be assembled and bonded to a final product, which results in lower production costs and shorter production time. The half-shells of the applicator are moved from the open position to the working position by simply being folded around the film hinge and pressed against each other, so that the latching elements lock into the receiving elements, which can also be done by the end user before use.

FIG. 1: Applicator in open configuration

Figure 2:
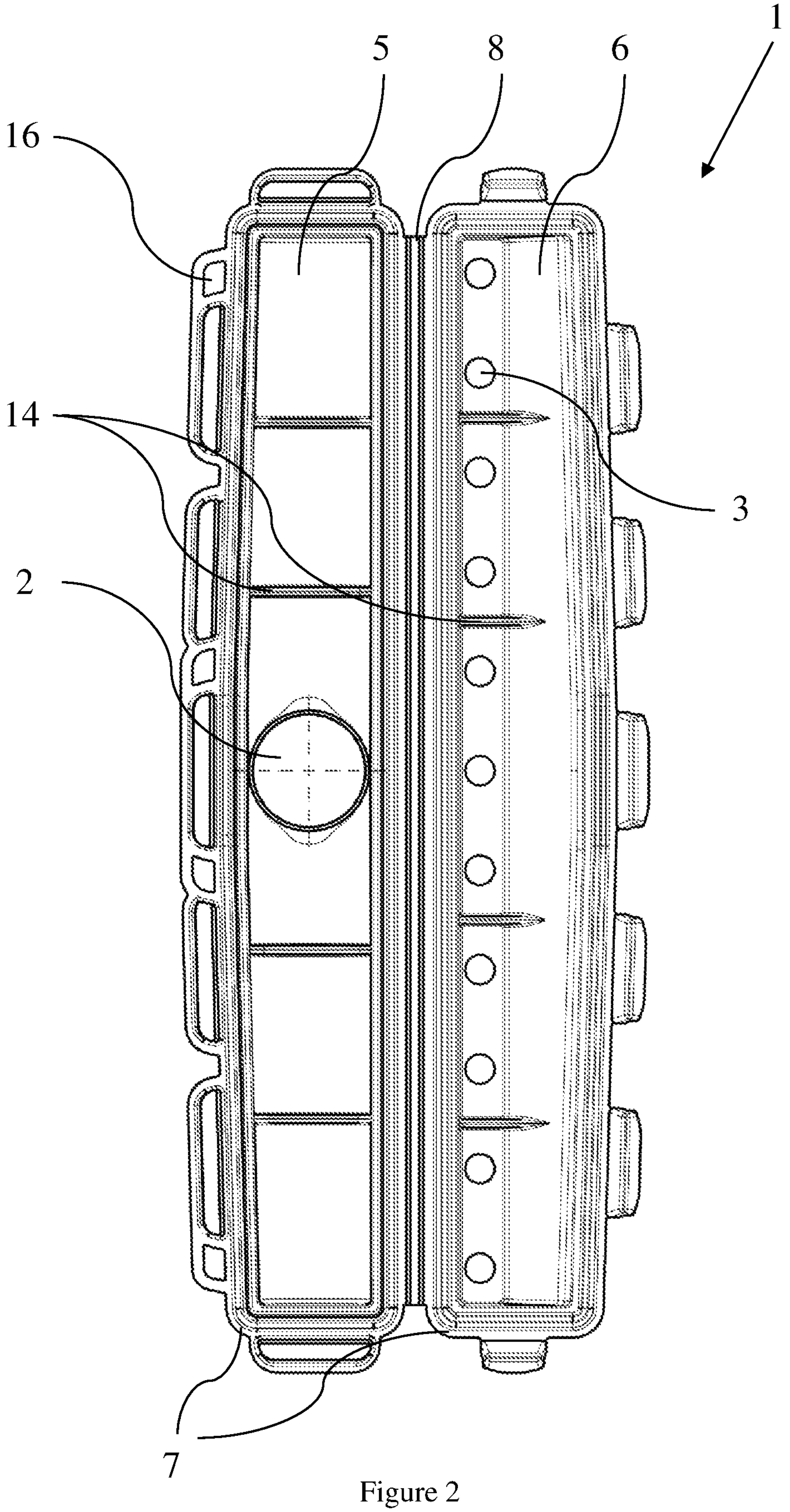

FIG. 2: Applicator in open configuration

Figure 3:
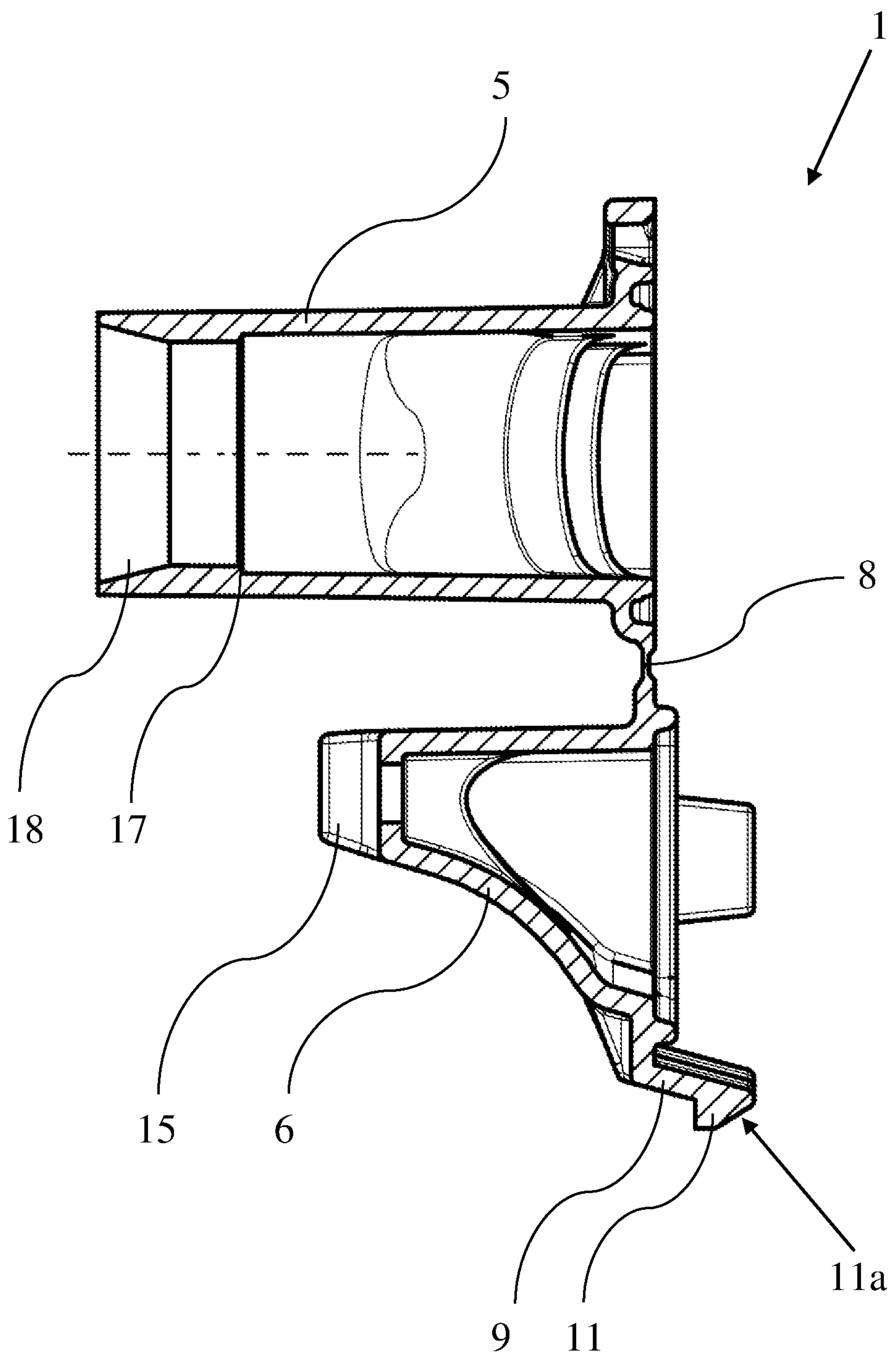

FIG. 3: Cross-section of the applicator in open configuration

Figure 4:
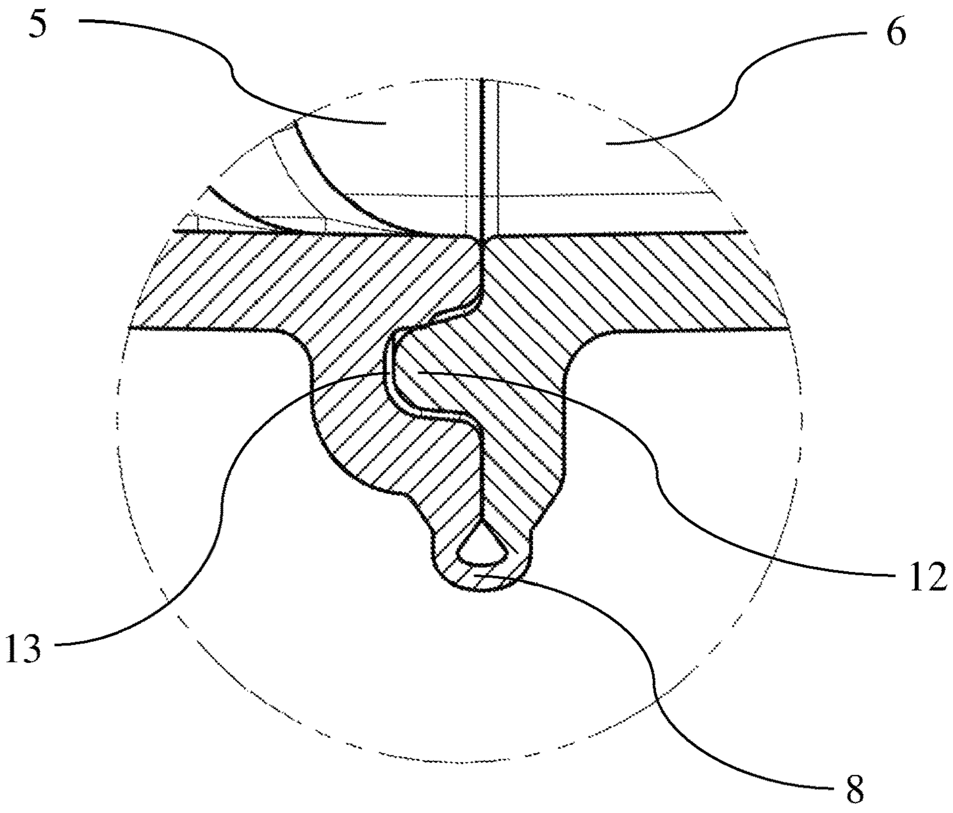
Figure 5:
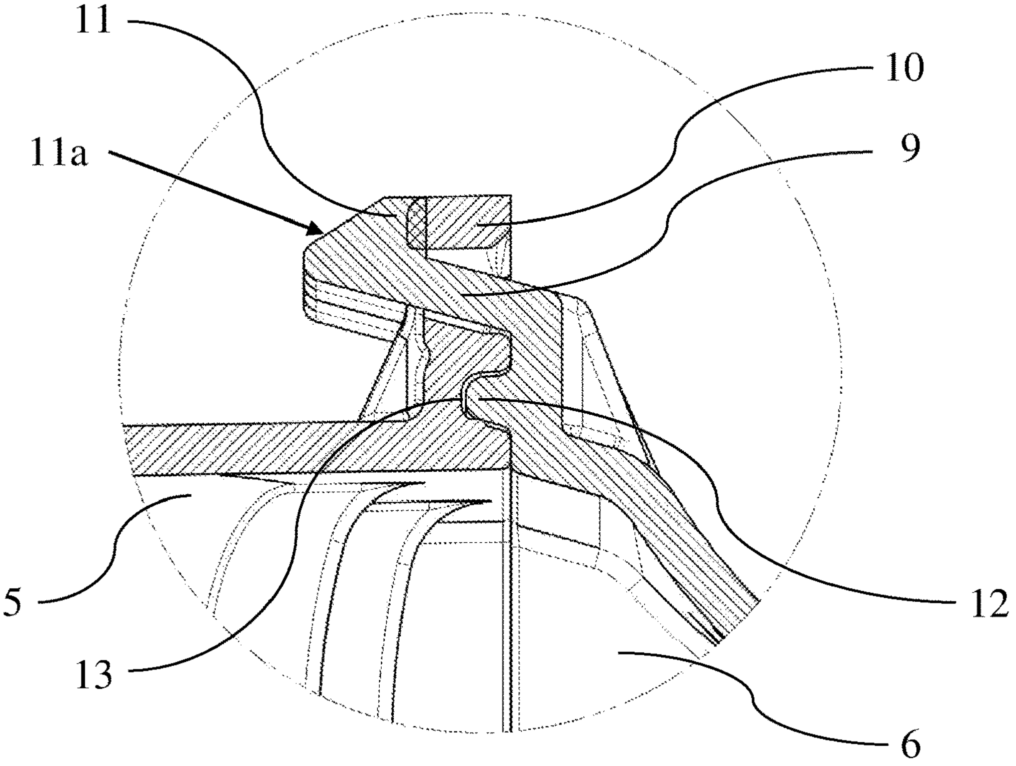
Figure 6:
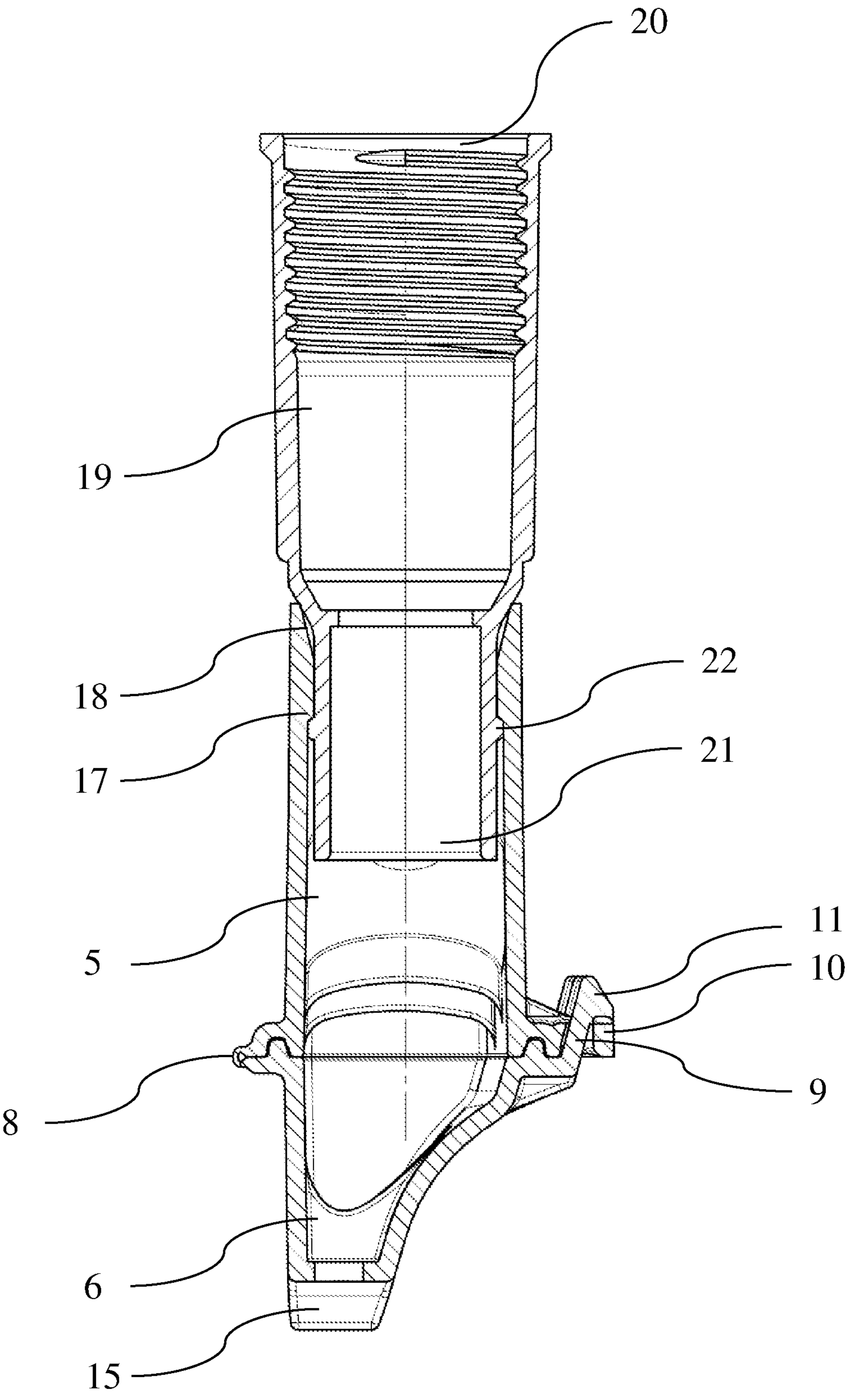

FIG. 4: Detail of a hinge connection of the applicator half-shells in a working position, cross-section FIG. 5: Detail of a connection between a latch element with a barb and a receiving element of the applicator half-shells in a working position, cross-section FIG. 6: Kit of parts comprising a paste-like medium applicator and an adapter The invention is described in more detail in the following by way of various embodiments.

The technical problem is solved by a paste-like medium applicator 1 comprising an inlet opening 2 of the paste-like medium applicator, a plurality of outlet openings 3 for applying a paste-like medium onto a surface to be treated, and a distribution channel 4 for distributing the paste-like medium from the applicator's inlet opening to the outlet openings, wherein the paste-like medium applicator is formed of a first elongated half-shell 5 comprising four side walls and a bottom, in which the inlet opening 2 of the applicator is disposed, and a second elongated half-shell 6 comprising four side walls and a bottom, in which a plurality of outlet openings 3 are arranged, wherein the side walls of the two half-shells have at each open end an integrally shaped circular edge surface 7, which, in the working position of the applicator, abut each other so that the half-shells define a distribution channel, wherein the first and second half-shells are in each case on one of their longitudinal sides integrally connected by means of a film hinge 8 and the first 5 and second 6 half-shells being respectively provided with latching elements 9 with a barb and the second 6 and first 5 half-shells being respectively provided with receiving elements 10 for receiving the latching elements 9 so that in the working position of the applicator each latching element with the barb is latched in the corresponding receiving element.

The receiving elements can be formed in the form of elastic arcs 10, which are integrally shaped on the second 6 and first 5 half-shell, respectively, and a respective barb 11 is formed by an oblique surface 11*a*, such that, when the half-shells move from the open position to the working position, each barb 11 first rests on the corresponding receiving element 10, the barb with its oblique surface 11*a* causing elastic deformation of the receiving element 10 and/or the latching element 9 with the barb when the half-shells continue moving towards each other until the half-shells 5, 6 reach the final working position, in which the barb latches in the receiving element.

In a further embodiment, the receiving elements are formed in the form of recesses in the second and first half-shells, respectively, and the latching elements are formed by an elastic web, each barb being formed by an oblique surface such that, when the half-shells move from the open position to the working position, a respective barb first rests on the corresponding receiving element which, when the half-shells continue moving towards each other, deflects the elastic latch element with the barb, until the half-shells reach the final working position, in which the barb is latched in the receiving element.

A circular edge surface 7 of the first and second half-shell, respectively, is provided with at least one circular groove 13 and the circular edge surface of the second and first half-shells, respectively, is provided with at least one first circular ridge 12, such that, in the working position, the circular groove 13 and the first circular ridge 12 engage each other, thus ensuring a better seal between the two half-shells 5, 6 and the suitability of the applicator also for higher pressures of the paste-like medium.

The first 5 and/or second 6 half-shells are provided at a respective bottom with a plurality of reinforcing ribs 14 arranged in a direction substantially perpendicular to each longitudinal side of the half-shells so as to connect the opposite longitudinal sides. Their function is to increase the mechanical strength of the longitudinal sides of the half-shells. This reduces the pressure on the latching elements when the applicator is in use.

In its longitudinal direction, the applicator is provided at both ends with one spacer element 15 that allows an even application of the paste-like medium onto a surface.

The outlet openings 3 can be formed with different diameters, such that the outlet openings in the vicinity of the centre axis of the applicator are formed with a smaller diameter, while the diameter of the outlet openings increases with the distance from the centre axis. This ensures a more even application of the paste-like medium onto a surface to be treated, as the pressure of the paste-like medium during application is highest in the central axis of the applicator and gradually decreases downstream the distribution channel in the directions of the longitudinal ends of the applicator. The diameters of the outlet openings are selected as a function of the viscosity of the paste-like medium.

The paste-like medium applicator may be provided with receiving holes 16 for receiving auxiliary tools, such as scrapers, trowels, blades, side spacers, stroke limiters, etc.

The paste-like medium applicator is made from plastic, preferably HDPE.

The inlet opening 2 of the applicator may be adapted for coupling with a paste-like medium container or a paste-like medium dispenser. Alternatively, the inlet opening 2 of the applicator may be formed in the form of a sleeve, the inner circular surface of which is formed by a step 17 for coupling with an adapter. An entry portion 18 of the inlet opening of the applicator may be configured in a way to be tapered to facilitate insertion of the adapter.

The invention further relates to a kit of parts comprising a paste-like medium applicator and an adapter 19 having an inlet opening 20 of the adapter, adapted for coupling to a paste-like medium container or a paste-like medium dispenser, and a tubular outlet opening 21 of the adapter, which is circumferentially provided with a second circular ridge 22.

When the adapter is inserted into the inlet opening of the applicator, the second circular ridge 22 engages the step 17 in the inlet opening 2 of the paste-like medium applicator, whereby the paste-like medium applicator is fixed in position on the adapter 19.

The axis of the inlet opening of the applicator is inclined at an angle of less than 90° with respect to the contact plane of the half-shells in the working position in the transverse direction of the applicator. It is herewith ensured that, due to the rotating connection between the applicator and the adapter, that the applicator adapts to the working surface during use.

The invention claimed is:

1. A paste-like medium applicator comprising an inlet opening of the paste-like medium applicator, a plurality of outlet openings for applying a paste-like medium onto a surface to be treated, and a distribution channel for distributing the paste-like medium from the applicator's inlet opening to the outlet openings, wherein the paste-like medium applicator is formed of a first elongated half-shell comprising four side walls and a bottom, in which the inlet opening of the applicator is disposed, and a second elongated half-shell comprising four side walls and a bottom, in which a plurality of outlet openings are arranged, wherein the side walls of the two half-shells have at each open end an integrally shaped circular edge surface, which, in the working position of the applicator, abut each other so that the half-shells define the distribution channel, wherein the first and second half-shells are in each case on one of their longitudinal sides integrally connected by means of a film hinge and one of the first and second half-shells being respectively provided with latching elements with a barb and the other of the second and first half-shells being respectively provided with receiving elements for receiving the latching elements so that in the working position of the applicator each latching element with the barb is latched in the corresponding receiving element.

2. The applicator according to claim 1, characterized in that the receiving elements are formed in the form of elastic arcs, which are integrally shaped on the second and first half-shell, respectively, and each respective barb is formed by an oblique surface, such that, when the half-shells move from the open position to the working position, each barb first rests on the corresponding receiving element, the barb with its oblique surface causing elastic deformation of the receiving element and/or the latching element with the barb when the half-shells continue moving towards each other until the half-shells reach the final working position, in which the barb latches in the receiving element.

3. The applicator according to claim 1, characterized in that the receiving elements are formed in the form of recesses in the second and first half-shells, respectively, and the latching elements are formed by an elastic web, each barb being formed by an oblique surface such that, when the half-shells move from the open position to the working position, a respective barb first rests on the corresponding receiving element which, when the half-shells continue moving towards each other, deflects the elastic latch element with the barb, until the half-shells reach the final working position, in which the barb is latched in the receiving element.

4. The applicator according to claim 1, characterized in that the circular edge surface of one of the first and second half-shell, respectively, is provided with at least one circular groove and the circular edge surface of the other of the second and first half-shells, respectively, is provided with at least one first circular ridge, such that, in the working position, the circular groove and the first circular ridge engage each other, thus ensuring a better seal between the two half-shells when the applicator is in the working position.

5. The applicator according to claim 1, characterized in that the first and/or second half-shells are provided at a respective bottom with a plurality of reinforcing ribs arranged in a direction substantially perpendicular to each longitudinal side of the half-shells so as to connect the opposite longitudinal sides.

6. The applicator according to claim 1, characterized in that the applicator is provided at both ends with one spacer element that allows an even application of the paste-like medium onto a surface.

7. The applicator according to claim 1, characterized in that the outlet openings are formed with different diameters, such that the outlet openings in the vicinity of the centre axis of the applicator are formed with a smaller diameter, while the diameter of the outlet openings increases with the distance from the centre axis.

8. The applicator according to claim 1, characterized in that the paste-like medium applicator is provided with receiving holes for receiving auxiliary tools.

9. The applicator according to claim 1, characterized in that the paste-like medium applicator is formed of plastics.

10. The applicator according to claim 1, characterized in that the inlet opening of the applicator is adapted for coupling with a paste-like medium container or a paste-like medium dispenser.

11. The applicator according to claim 1, characterized in that the inlet opening of the applicator is formed in the form of a sleeve, the inner circular surface of which is formed by a step for coupling with an adapter and an entry portion of the inlet opening of the applicator is configured in a way to be tapered to facilitate insertion of the adapter.

12. A kit of parts comprising a paste-like medium applicator according to claim 11 and an adapter having an inlet opening of the adapter, adapted for coupling to a paste-like medium container or a paste-like medium dispenser, and a tubular outlet opening of the adapter, which is circumferentially provided with a second circular ridge.

13. The kit of parts according to claim 12, characterized in that the axis of the inlet opening of the applicator is inclined at an angle of less than 90° with respect to the contact plane of the half-shells in the working position in the transverse direction of the applicator.

* * * * *